(12) United States Patent
Yagoshi et al.

(10) Patent No.: US 6,184,646 B1
(45) Date of Patent: Feb. 6, 2001

(54) STEPPING MOTOR CONTROL UNIT AND IMAGE FORMING APPARATUS

(75) Inventors: Teruaki Yagoshi; Takakazu Kobayashi, both of Kawasaki (JP)

(73) Assignee: Fujitsu Limited, Kawasaki (JP)

( * ) Notice: Under 35 U.S.C. 154(b), the term of this patent shall be extended for 0 days.

(21) Appl. No.: 09/409,380

(22) Filed: Sep. 30, 1999

(30) Foreign Application Priority Data

Oct. 13, 1998 (JP) .................................................. 10-290992

(51) Int. Cl.$^7$ ................................. H02P 8/00; B41J 29/38
(52) U.S. Cl. .......................................................... 318/696
(58) Field of Search ................................. 318/685, 696; 101/483, 484, 485, 486

(56) References Cited

U.S. PATENT DOCUMENTS 5,283,662 * 2/1994 Nakajima ............................. 358/409
5,625,269 * 4/1997 Ikeda ..................................... 318/696

FOREIGN PATENT DOCUMENTS 56-59378  5/1981  (JP) .

\* cited by examiner

*Primary Examiner*—Bentsu Ro
(74) *Attorney, Agent, or Firm*—Armstrong, Westerman, Hattori, McLeland & Naughton

(57) ABSTRACT

A stepping motor control unit for controlling a stepping motor is provided with a time measuring section for measuring time outputting a time completion pulse when a predetermined time elapses, a mutual excitation waveform output circuit switching a mutual excitation waveform to be applied to the stepping motor in response to the time completion pulse, an interrupt prohibit circuit outputting an interrupt enable signal which indicates an interrupt enable state or an interrupt prohibit state, an interrupt generating circuit generating an interrupt signal in response to the time completion pulse only when the interrupt enable signal indicates the interrupt enable state, and a processor controlling the stepping motor every time the interrupt signal is received.

7 Claims, 10 Drawing Sheets

→TIME

STEPPING MOTOR CONTROL UNIT AND IMAGE FORMING APPARATUS

BACKGROUND OF THE INVENTION

1. Field of the Invention

The present invention generally relates to stepping motor control units and image forming apparatuses, and more particularly to a stepping motor control unit which controls a stepping motor of an equipment such as an image forming apparatus, and to an image forming apparatus which uses such a stepping motor control unit. The present invention is particularly suited for controlling the speed and the like of a stepping motor which accurately transports a recording medium such as paper in printers, facsimile machines and copying machines.

2. Description of the Related Art

FIG. 1 is a system block diagram generally showing a printer control system. The printer control system shown in FIG. 1 includes an image data storage part 61 which stores image data, an image data processing controller 62, a printer control unit 63, a driving system equipment 64 such as a stepping motor, a heating system equipment 65 such as a heat roller fixing unit, an optical system equipment 66 such as a laser head, other equipments 67, and sensors 68 which are required to control the various equipments. For example, the image data stored in the image data storage part 61 are obtained by an input from a personal computer, a facsimile signal, an input from an image scanning or the like.

The image processing controller 62 obtains the image data from the image data storage part 61, and converts the image data into a format which can be understood by the printer control unit 63 before supplying the image data to the printer control unit 63. The printer control unit 63 controls the equipments 64 through 67 in order to print the image data supplied thereto. The printer control unit 63 reads outputs of the sensors 68 during the print control process, and switches the control operation.

FIG. 2 is a diagram generally showing an example of a printer. The printer shown in FIG. 2 includes a resist motor 70, a resist roller 71 which is driven by the resist motor 70 and transports paper, a pickup roller 72 which picks up the paper from a paper cassette 79, an eject roller 73, a transport path 74, a photo sensor 75 for detecting the position of the paper, a photoconductive drum 76, a laser optical system unit 77 for forming a latent image on the photoconductive drum 76 by writing an optical image, a heat roller fixing unit 78 for fixing a toner image on the paper, and the paper cassette 79. The illustration of a developing part and a fixing part of the printer is omitted in FIG. 2.

The resist roller 71, the pickup roller 72 and the eject roller 73 shown in FIG. 2 are driven by a stepping motor. A description will be given of a speed control of the resist motor 70 which drives the resist roller 71. When a print start instruction is input, the pickup roller 72 rotates and picks up the paper from the paper cassette 79, and in addition, the resist motor 70 is rotated to transport the paper. The resist motor 70 is accelerated to a predetermined speed and thereafter assumes a constant speed state by maintaining the predetermined speed. For example, when the resist motor 70 is in the constant speed state and the trailing edge of the paper passes the photo sensor 75, an output of the photo sensor 75 changes from an ON state to an OFF state, that is, falls to a low level, thereby decelerating the resist motor 70.

FIG. 3 is a system block diagram showing a conventional stepping motor control unit of the printer. The stepping motor control unit shown in FIG. 3 includes a processor (CPU) 1, a timer resistor and down counter 2, a mutual excitation waveform output circuit 3, a motor driving circuit 4, a stepping motor 5, an interrupt generating circuit 6, an input port 7 for inputting a paper position state information signal from a sensor, and a ROM 8 which stores motor speed control data.

The processor 1 is located within the printer control unit 63 shown in FIG. 1. The processor 1 writes a time value in the timer register and down counter 2, and also control other parts of the printer. These other parts of the printer include the driving system equipment 64, the heating system equipment 65, the optical system equipment 66, and the other equipments 67. The timer register and down counter 2 outputs a time completion pulse when the time value instructed by the processor 1 is measured. This time completion pulse is input to the mutual excitation waveform output circuit 3. When the time completion pulse is input, the mutual excitation waveform output circuit 3 switches the mutual excitation waveform. An output of the mutual excitation waveform output circuit 3 is subjected to a power amplification in the motor driving circuit 3 before being applied to the stepping motor 5.

The time completion pulse is also input to the interrupt generating circuit 6. The interrupt generating circuit 6 turns ON an interrupt signal S when the time completion pulse is input. When the interrupt signal S is turned ON, the processor 1 executes a processing program for controlling the stepping motor 5. The processing program for controlling the stepping motor 5 controls the stepping motor 5 by referring to the data stored in the ROM 8 and the sensor output received via the input port 2.

The ROM 8 includes an acceleration table 8a and a deceleration table 8b. In the acceleration table 8a, "phase-A and 10 $\mu$s" are written at an address 0 as shown in FIG. 4, indicating that the phase-A is to be excited first and that the time value is 10 $\mu$s. In addition, in the acceleration table 8a, "8 $\mu$s" is written at an address 1, "6 $\mu$s" is written at an address 2, and "4 $\mu$s" is written at an address 3. In addition, "2 $\mu$sF" is written at an address 4 to indicate that the time value is 2 $\mu$s and this data is the last data in the acceleration table 8a.

On the other hand, in the deceleration table 8b, "4 $\mu$s" is written at an address 0, "6 $\mu$s" is written at an address 1, and "8 $\mu$s" is written at an address 2. Further, "10 $\mu$sF" is written at an address 3 to indicate that the time value is 10 $\mu$s and that this data is the last data in the deceleration table 8b.

FIGS. 5 and 6 are diagrams for explaining example of an acceleration control, a constant speed control, and a deceleration control of the stepping motor 5. FIG. 5 shows excitation pulses during each period, and FIG. 6 shows a mutual excitation waveform for each phase during a start control and a constant speed control of a 2-phase excitation type stepping motor. In FIG. 6, an interrupt signal SS shown below the interrupt signal S is obtained by the present invention, as will be described later.

FIG. 7 is a diagram for explaining signal exchanges between the timer register down counter 2 and the mutual excitation waveform output circuit 3. The time value is written in a timer register of the timer register and down counter 2 by the processor 1. When the processor 1 outputs a timer start trigger signal, the value in the timer register of the timer register and down counter 2 is loaded into a down counter of the timer register and down counter 2, and the value of the down counter is decremented by 1 every time a time clock is input thereto. After outputting the timer start trigger signal, the processor 1 writes the next time value in the timer register of the timer register and down counter 2. The processor 1 supplies an output enable signal to the mutual excitation waveform output circuit 3 at the same time as supplying the timer start trigger signal to the timer register and down counter 2. As a result, the mutual excitation waveform output circuit 3 excites a phase specified by the processor 1, such as a phase φA, for example.

When the down counter of the timer register and down counter 2 outputs a time completion pulse, the value of the timer register of the timer register and down counter 2 is loaded into the down counter of the timer register and down counter 2, and the down counter again starts to measure the time. The time completion pulse is supplied to the mutual excitation waveform output circuit 3 as a mutual excitation count-up pulse. In response to the mutual excitation count-up pulse, the mutual excitation waveform output circuit 3 switches the mutual excitation waveform, and excites the phases φA and φB, for example.

FIG. 8 is a diagram showing the construction of the mutual excitation waveform output circuit 3 shown in FIG. 3. The mutual excitation waveform output circuit 3 shown in FIG. 8 includes a mutual excitation waveform register 110, a 3-bit up-down counter 111, and a waveform decoder 112.

The processor 1 writes data into the mutual excitation waveform register 110. The contents of the mutual excitation waveform register 110 are loaded into the 3-bit up-down counter 111. The 3-bit up-down counter 111 operates as an up-counter when the stepping motor 5 rotates in a forward direction, and operates as a down-counter when the stepping motor 5 rotates in a reverse direction. The value of the 3-bit up-down counter 111 is incremented by 1 or is decremented by 1 in response to the mutual excitation count-up pulse. The waveform decoder 112 decodes the value of the 3-bit up-down counter 111 in response to an output enable signal which is ON, and excites a phase which is determined by the decoded result. For example, the waveform 112 excites the phase φA when the value of the 3-bit up-down counter 111 is "000", and excites the phases φA and φB when the value of the 3-bit up-down counter 111 is "001".

Next, a description will be given of the operation of the stepping motor control unit shown in FIG. 3. When rotating the stepping motor 5, the processor 1 sets the time value (10 μs) at the address 0 of the acceleration table 8a into the timer register of the timer register and down counter 2, and sets the phase-A into the mutual excitation waveform register 110. In addition the processor 1 supplies the timer start trigger signal to the timer register and down counter 2, and supplies the output enable signal to the mutual excitation waveform output circuit 3. After supplying the timer start trigger signal to the timer register and down counter 2, the processor 1 sets the time value (8 μs) at the address 1 of the acceleration table 8a into the timer register of the timer register and down counter 2.

When the timer register and down counter 2 measures the time (initially 10 μs) instructed by the processor 1, the time completion pulse is output, and in addition, the time value (8 μs in this case) of the timer register is loaded into the down counter of the timer register and down counter 2. When the time completion pulse is output, the mutual excitation waveform output circuit 3 switches the mutual excitation waveform, and the interrupt generating circuit 6 turns ON an interrupt signal S.

When the interrupt signal S is turned ON, the processor 1 executes a processing program for controlling the stepping motor 5. This stepping motor control program carries out a process by referring to the acceleration table 8a during acceleration of the stepping motor 5, carries out a process based on the sensor output during constant speed rotation of the stepping motor 5, and carries out a process by referring to the deceleration table 8b during deceleration of the stepping motor 5.

In this particular case where the stepping motor 1 is accelerating at the present, the processor 1 reads the data (6 μs) at the address 2 of the acceleration table 8a when the interrupt signal S is turned ON, and sets this data into the timer register of the timer register and down counter 2. Thereafter, the processor 1 carries out a similar operation every time the interrupt signal S is turned ON. When the processor 1 reads the data (2 μs) at the address 4 of the acceleration table 8a, the processor 1 recognizes that this data is the last data in the acceleration table 8a, turns ON a constant speed rotation flag, and sets the time value (2 μs) into the timer register of the timer register and down counter 2. The mutual excitation waveform is thereafter switched for every 2 μs.

When the interrupt signal S is turned ON during the constant speed rotation of the stepping motor 5, the processor 1 checks whether or not the sensor output made a transition from an ON state (indicating the existence of the paper) to the OFF state. If the sensor output changes from the ON state to the OFF state, the processor 1 turns ON a deceleration flag. On the other hand, the processor 1 does not carries out a specific process if the sensor output does not change.

When the interrupt signal S is turned ON in a state where the deceleration flag is turned ON, the processor 1 sets the data (4 μs) at the address 0 of the deceleration table 8b into the timer register of the timer register and down counter 2. Next time when the interrupt signal S is turned ON, the processor 1 reads the data (6 μs) at the address 1 of the deceleration table 8b, and sets the read data into the timer register of the timer register and down counter 2. A similar process is thereafter carried out every time the interrupt signal S is turned ON.

According to the conventional stepping motor control unit, the processor constantly reads the output of the paper position detecting sensor, and the output of the paper position detecting sensor is read every time the mutual excitation waveform is switched even during the constant speed rotation of the stepping motor when the speed control is unnecessary. For this reason, the ratio of the execution time of the processing program for controlling the stepping motor becomes large with respect to the total time in which the processor is operating, and there was a problem in that the control of the processor with respect to the other equipments became limited thereby,

SUMMARY OF THE INVENTION

Accordingly, it is a general object of the present invention to provide a novel and useful stepping motor control unit in which the problem described above is eliminated.

Another and more specific object of the present invention is to provide a stepping motor control unit and an image forming apparatus which prohibit an interrupt to a processor when switching a constant speed control of a stepping motor, and cancel the interrupt prohibit at a transition point of a paper position detecting sensor signal, so as to control the rotation and stopped states of the stepping motor. According to the stepping motor control unit of the present invention, a load on the processor with respect to the stepping motor control is reduced, and it becomes possible to accurately control the equipments other than the stepping motor. Furthermore, the processor can carry out the processes with a sufficient margin, so that the stepping motor control unit can flexibly cope with additional equipments which are to be controlled by the processor.

Still another object of the present invention is to provide a stepping motor control unit for controlling a stepping motor, comprising time measuring means for measuring time outputting a time completion pulse when a predetermined time elapses, a mutual excitation waveform output circuit switching a mutual excitation waveform to be applied to the stepping motor in response to the time completion pulse, an interrupt prohibit circuit outputting an interrupt enable signal which indicates an interrupt enable state or an interrupt prohibit state, an interrupt generating circuit generating an interrupt signal in response to the time completion pulse only when the interrupt enable signal indicates the interrupt enable state, and a processor controlling the stepping motor every time the interrupt signal is received. According to the stepping motor control unit of the present invention, a load on the processor with respect to the stepping motor control is reduced, and it becomes possible to accurately control equipments other than the stepping motor. Furthermore, the processor can carry out the processes with a sufficient margin, so that the stepping motor control unit can flexibly cope with additional equipments which are to be controlled by the processor.

A further object of the present invention is to provide an image forming apparatus comprising image forming means for forming an image on a medium, transport means for transporting the medium, a stepping motor driving said transport means, time measuring means for measuring time outputting a time completion pulse when a predetermined time elapses, a mutual excitation waveform output circuit switching a mutual excitation waveform to be applied to the stepping motor in response to the time completion pulse, an interrupt prohibit circuit outputting an interrupt enable signal which indicates an interrupt enable state or an interrupt prohibit state, an interrupt generating circuit generating an interrupt signal in response to the time completion pulse only when the interrupt enable signal indicates the interrupt enable state, and a processor controlling the stepping motor every time the interrupt signal is received. According to the image forming apparatus of the present invention, a load on the processor with respect to the stepping motor control is reduced, and it becomes possible to accurately control equipments other than the stepping motor. Furthermore, the processor can carry out the processes with a sufficient margin, so that the stepping motor control unit can flexibly cope with additional equipments which are to be controlled by the processor.

Other objects and further features of the present invention will be apparent from the following detailed description when read in conjunction with the accompanying drawings.

DESCRIPTION OF THE PREFERRED EMBODIMENTS

Figures 9, 10:
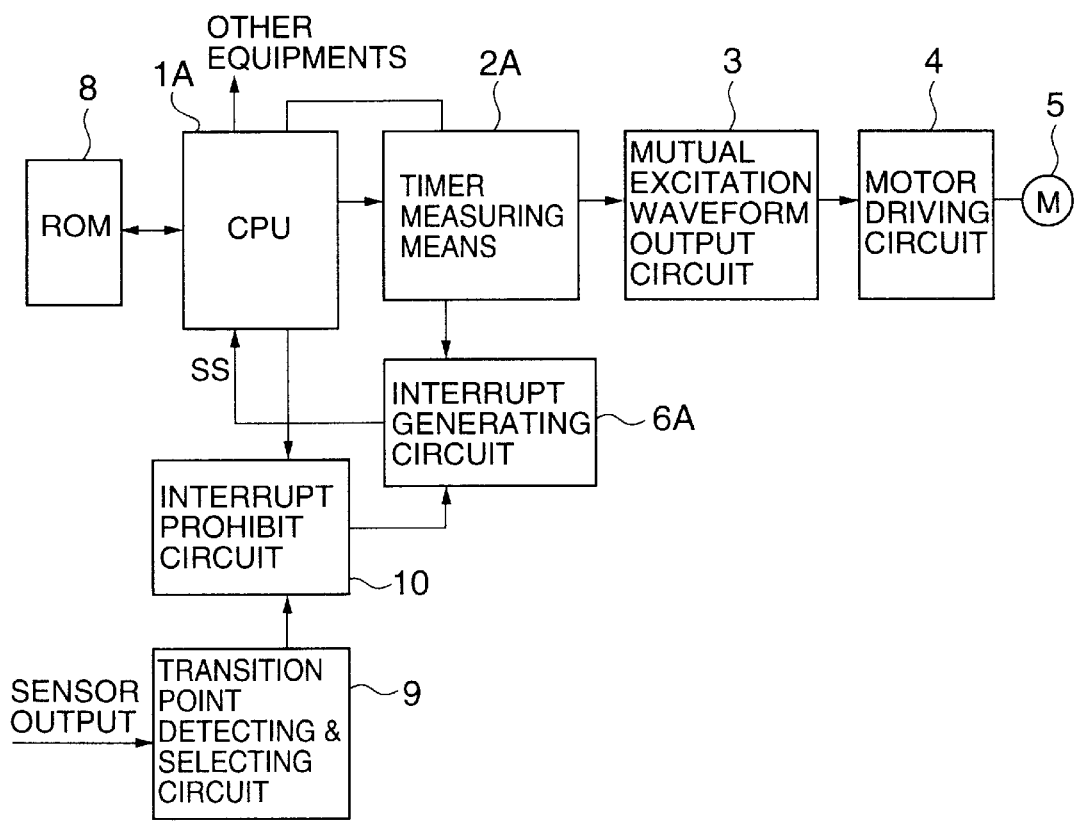
FIG. 9 is a system block diagram showing an embodiment of a stepping motor control unit according to the present invention.
FIG. 10 is a diagram showing an acceleration table and a deceleration table stored in a ROM.

FIG. 9 is a system block diagram showing an embodiment of a stepping motor control unit according to the present invention. In FIG. 9, those parts which are the same as those corresponding parts in FIG. 3 are designated by the same reference numerals, and a description thereof will be omitted. This embodiment of the stepping motor control unit is applied to an embodiment of an image forming apparatus according to the present invention. This embodiment of the image forming apparatus has a construction shown in FIG. 2, for example.

In this embodiment, the sensor output is input to a transition point detecting and selecting circuit 9. The transition point detecting and selecting circuit 9 includes a rising edge detection means for detecting a rising edge of the sensor output, a falling edge detection means for detecting a falling edge of the sensor output, and a significant instant detection means for detecting a significant instant, and outputs one of an output of the rising edge detection means, an output of the falling edge detection means, an output of the significant instant detection means and no signal, depending on an instruction from a processor (CPU) 1A. This transition point detecting and selecting circuit 9 further includes a noise elimination circuit for eliminating a noise in the sensor output.

An interrupt prohibit circuit 10 outputs an output signal having a value which enables an interrupt when a pulse signal is output from the transition point detecting and selecting circuit 9. The value of the output signal of the interrupt prohibit circuit 10 can also be controlled by the processor 1A.

A time measuring means 2A includes a timer register. A time value supplied from the processor 1A is set in the timer register of the time measuring means 2A. The time measuring means 2A outputs a time completion pulse when a time specified by the time value of the timer register elapses, and again starts measuring the time based on the time value of the timer register.

An interrupt generating circuit 6A generates an interrupt with respect to the processor 1A when the time completion pulse is supplied from the time measuring means 2A, in a state where the output signal of the interrupt prohibit circuit 10 has the value which enables the interrupt. On the other hand, in a state where the output signal of the interrupt prohibit circuit 10 has a value which prohibits the interrupt, the interrupt generating circuit 6 does not generate an interrupt with respect to the processor 1A even when the time completion pulse is supplied from the time measuring means 2A. The processor 1A executes a processing program for controlling the stepping motor 5 when the interrupt is generated. The processing program for controlling the stepping motor 5 carries out an acceleration control based on the acceleration table 8a which is stored in the ROM 8 during the acceleration, and carries out a deceleration control based on the deceleration table 8b which is stored in the ROM 8 during the deceleration. FIG. 10 shows the acceleration table 8a and the deceleration table 8b which are stored in the ROM 8.

When the time completion pulse is generated, the mutual excitation waveform output circuit 3 switches the mutual excitation waveform. The output of the mutual excitation waveform output circuit 3 is applied to the stepping motor 5 via the motor driving circuit 4.

Of course, at least one the functions of the time measuring means 2A, the interrupt generating circuit 6A, the transition point detecting and selecting circuit 9 and the interrupt prohibit circuit 10 may also be realized by the processor 1A.

Figure 11:
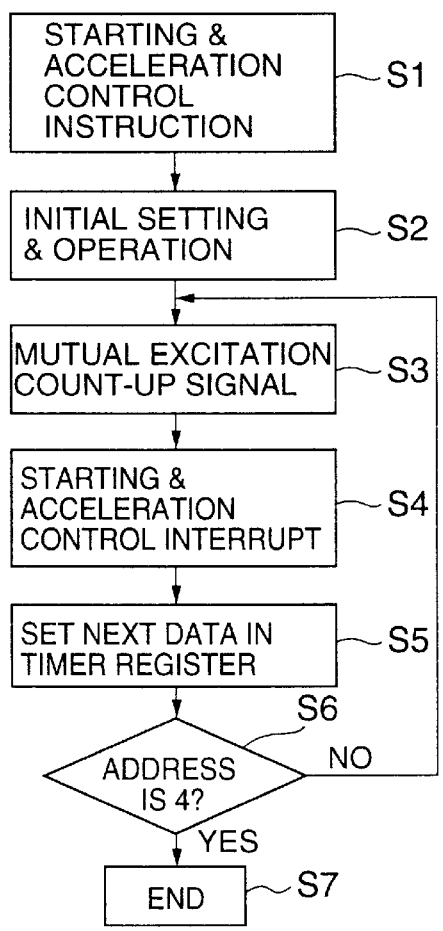
FIG. 11 is a flow chart for explaining starting and acceleration of a stepping motor.

FIG. 11 is a flow chart for explaining starting and acceleration of the stepping motor 5. More particularly, FIG. 11 shows the process generally carried out by the processor 1A and the elements coupled thereto.

In FIG. 11, a step S1 instructs a starting and acceleration control instruction from the processor 1A, and a step S2 carries out an initial setting and initial operation by the processor 1A in response to this starting and acceleration control instruction. More particularly, the initial values, namely, the "phase-A" excitation and the excitation time "10 µs", are read from the acceleration table 8a of the ROM 8 shown in FIG. 10, and are respectively supplied to the mutual excitation waveform output circuit 3 and a timer register of the time measuring means 2A. Thereafter, a timer start trigger signal is supplied to the time measuring means 2A, and an output enable signal is supplied to the mutual excitation waveform output circuit 3, and the operations of the time measuring means 2A and the mutual excitation waveform output circuit 3 are started. Then, the data (6 µs) at the address 1 of the acceleration table 8a is transferred to and is stored in the timer register of the time measuring means 2A.

The time completion pulse is generated when the time measuring means 2A measures "10 µs", and a step S3 switches to the next mutual excitation waveform by the mutual excitation waveform output circuit 3 to excite the phases φA and φB. In other words, the step S3 generates a mutual excitation count-up signal. In addition, a step S4 generates a starting and acceleration control interrupt signal by the interrupt generating circuit 6A in response to the time completion pulse. In response to the starting and acceleration control interrupt signal, a step S5 reads the data (6 µs) at the next address 2 of the acceleration table 8a by the processor 1A, and sets this data in the timer register of the time measuring means 2A. Accordingly, the output waveform of the mutual excitation waveform output circuit 3 is switched depending on the data read from the acceleration table 8a, so as to control the acceleration of the stepping motor 5.

A step S6 decides whether or not the address of acceleration table 8a within the ROM 8 is 4, by the processor 1A. The process ends if the decision result in the step S6 is YES. On the other hand, the process returns to the step S3 if the decision result in the step S6 is NO.

Accordingly, when the data at the address 4 of the acceleration table 8a is read from the ROM 8 and set in the timer register of the time measuring means 2A, the starting and acceleration control ends. Thereafter, the stepping motor 5 rotates at a constant speed, and the processor 1A supplies an interrupt prohibit signal to the interrupt prohibit circuit 10. Consequently, the stepping motor 5 is completely disconnected from the processor 1A and is controlled to rotate at the constant speed. When the interrupt enable signal output from the interrupt prohibit circuit 10 has a value prohibiting the interrupt, no interrupt signal SS is generated regardless of whether or not the time completion pulse, that is, a count-up pulse, is generated. On the other hand, the data "2 µs" at the address 4 of the acceleration table 8a is stored in the timer register of the time measuring means 2A, and the time completion pulse is supplied to the mutual excitation waveform output circuit 3 every time the time completion pulse is output from the time measuring means 2A. The mutual excitation waveform is switched for every 2 µs in response to the time completion pulse, at the stepping motor 5 is rotated at the constant speed.

Figure 12:
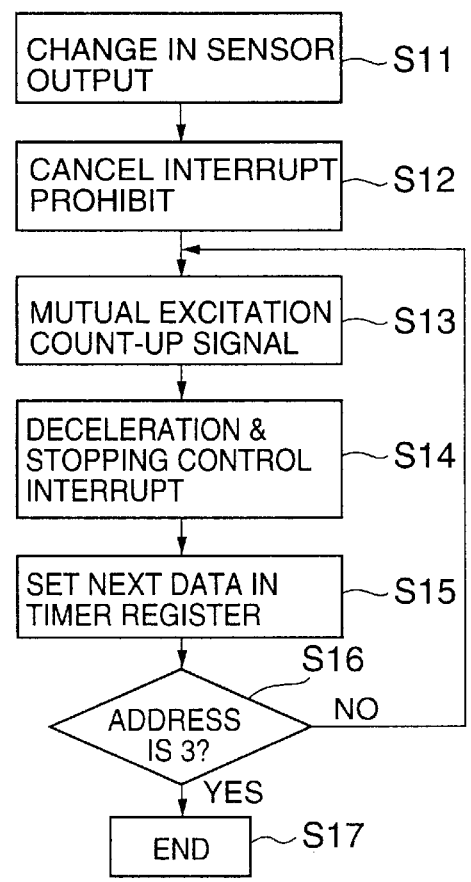
FIG. 12 is a flow chart for explaining a deceleration and stopping of the stepping motor.

FIG. 12 is a flow chart for explaining deceleration and stopping of the stepping motor 5. More particularly, FIG. 12 shows the process generally carried out by the processor 1A and the elements coupled thereto. For example, this deceleration and stopping control is carried out when a trailing edge of the paper is detected.

In FIG. 12, a step S11 outputs a signal from the transition point detecting and selecting circuit 9 indicating a change in the sensor output. A step S12 cancels the interrupt prohibit by outputting the interrupt enable signal from the interrupt prohibit circuit 10. Thereafter, when a step S13 generates the time completion pulse from the time measuring means 2A, a step S14 turns ON the interrupt signal SS output from the interrupt generating circuit 6A. Hence, the processor 1A sets the data (4 µs) at the address 0 of the deceleration table 8b within the ROM 8 and sets this data in the timer register of the time measuring means 2A. In other words, the step S13 generates a mutual excitation count-up signal, the step S14 generates a deceleration and stopping control interrupt signal by the interrupt generating circuit 6A in response to the time completion pulse, and the step S15 sets the data at the next address of the deceleration table 8b into the timer register of the time measuring means 2A in response to the deceleration and stopping control interrupt signal.

A step S16 decides whether or not the address of the deceleration table 8b within the ROM 8 is 3, by the processor 1A. The process ends if the decision result in the step S16 is YES. On the other hand, the process returns to the step S13 if the decision result in the step S16 is NO.

Accordingly, When the time measuring means 2A measures 4 µs, the time completion pulse is generated. The time completion pulse is supplied to the mutual excitation waveform output circuit 3, and the mutual excitation waveform is switched. The time completion pulse is also supplied to the interrupt generating circuit 6A which is enabled of the interrupt, and the interrupt signal SS is turned ON. When the interrupt signal SS is turned ON, the processor 1A reads the data (6 µs) at the address 1 of the deceleration table 8b, and sets this data to the timer register of the time measuring means 2A. When the data (10 µs) at the address 3 of the deceleration table 8b is read, this data is set in the timer register of the time measuring means 2A, and the deceleration and stopping control ends.

Figure 13:
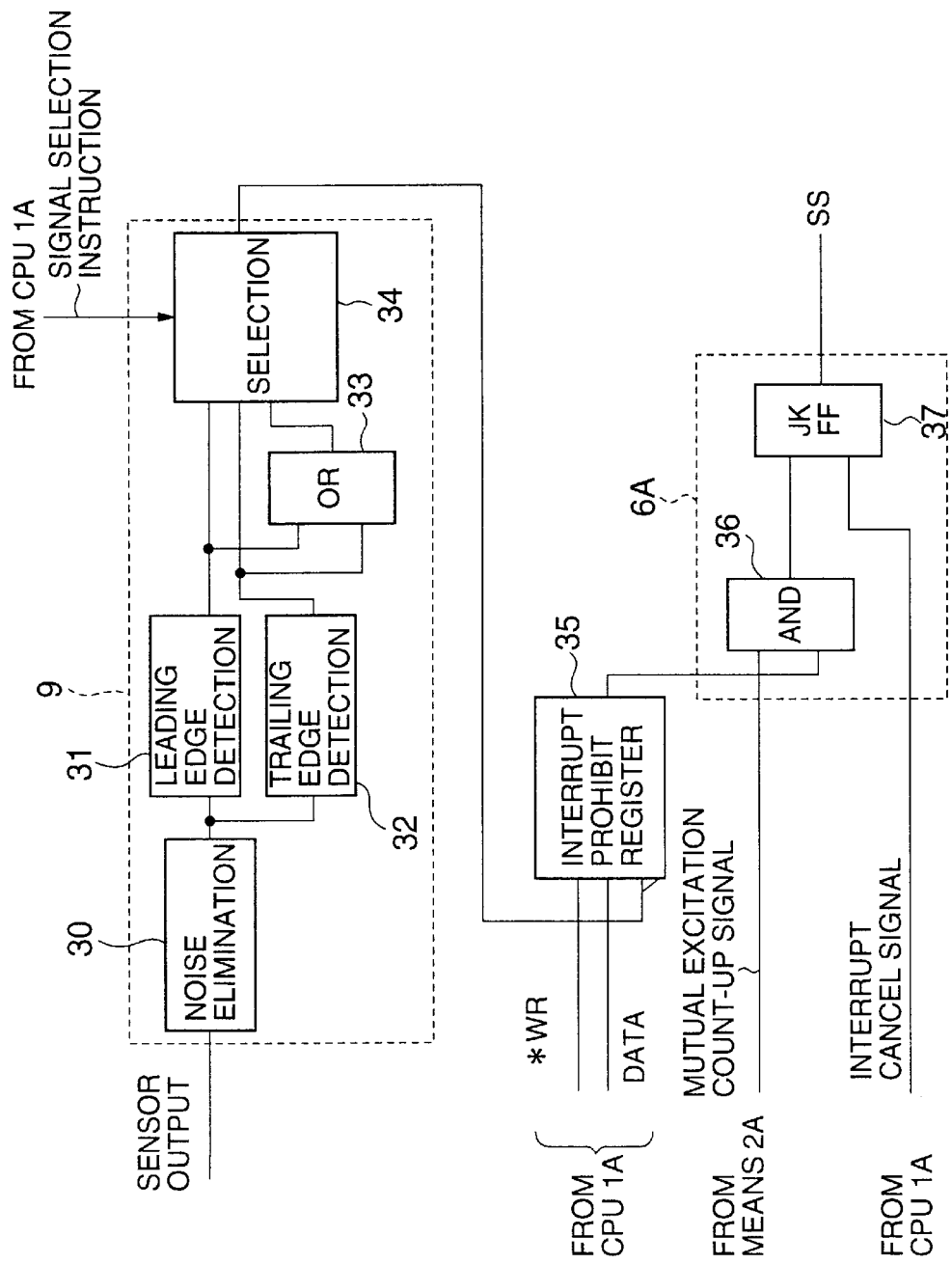
FIG. 13 is a system block diagram showing an embodiment of a transition point detecting and selecting circuit.

FIG. 13 is a system block diagram showing an embodiment of the transition point detecting and selecting circuit 9. The transition point detecting and selecting circuit 9 shown in FIG. 13 includes a noise elimination circuit 30, a leading edge detection circuit 31, a trailing edge detection circuit 32, an OR circuit 33, and a selection circuit 34.

The transition point detecting and selecting circuit 9 is coupled to the interrupt generating circuit 6A via an interrupt prohibit register 35. The interrupt generating circuit 6A includes an AND circuit 36 and a JK flip-flop circuit 37.

Figure 1:
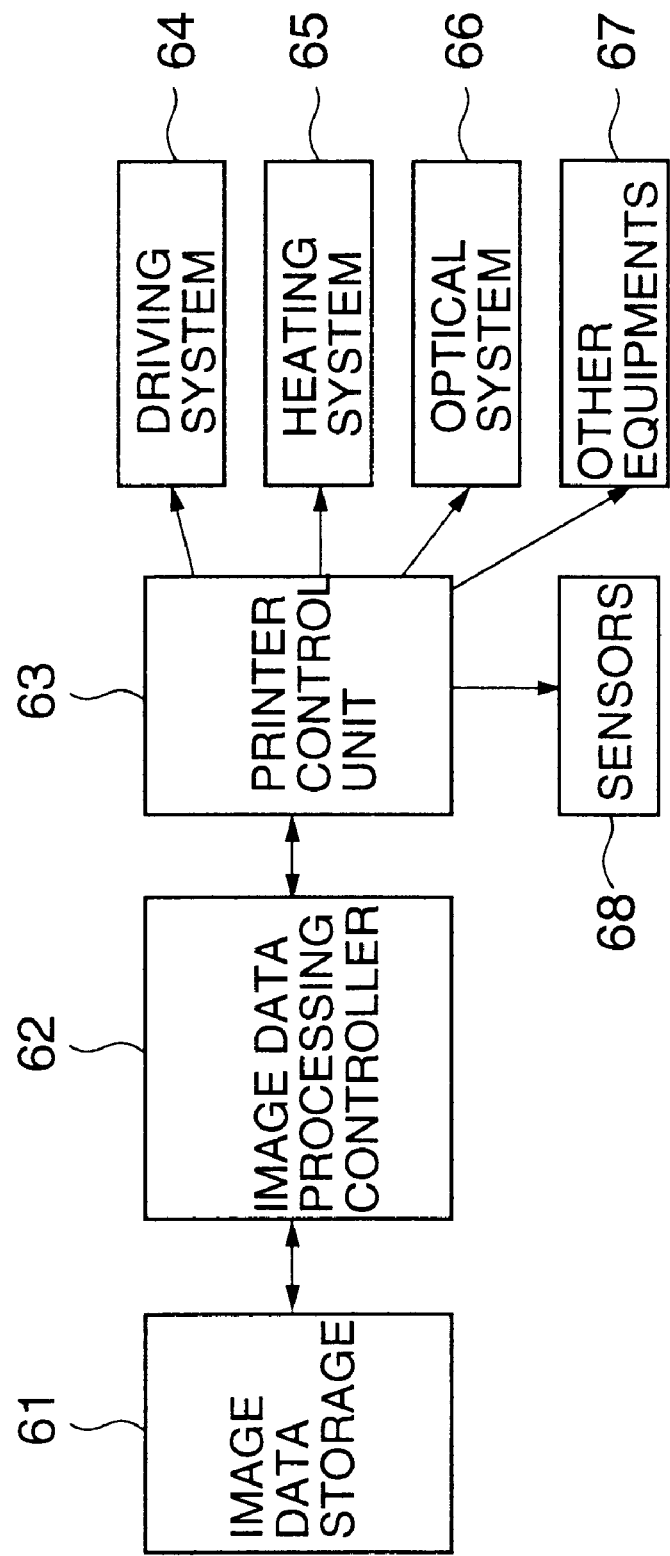
FIG. 1 is a system block diagram generally showing a printer control system.
Figure 2:
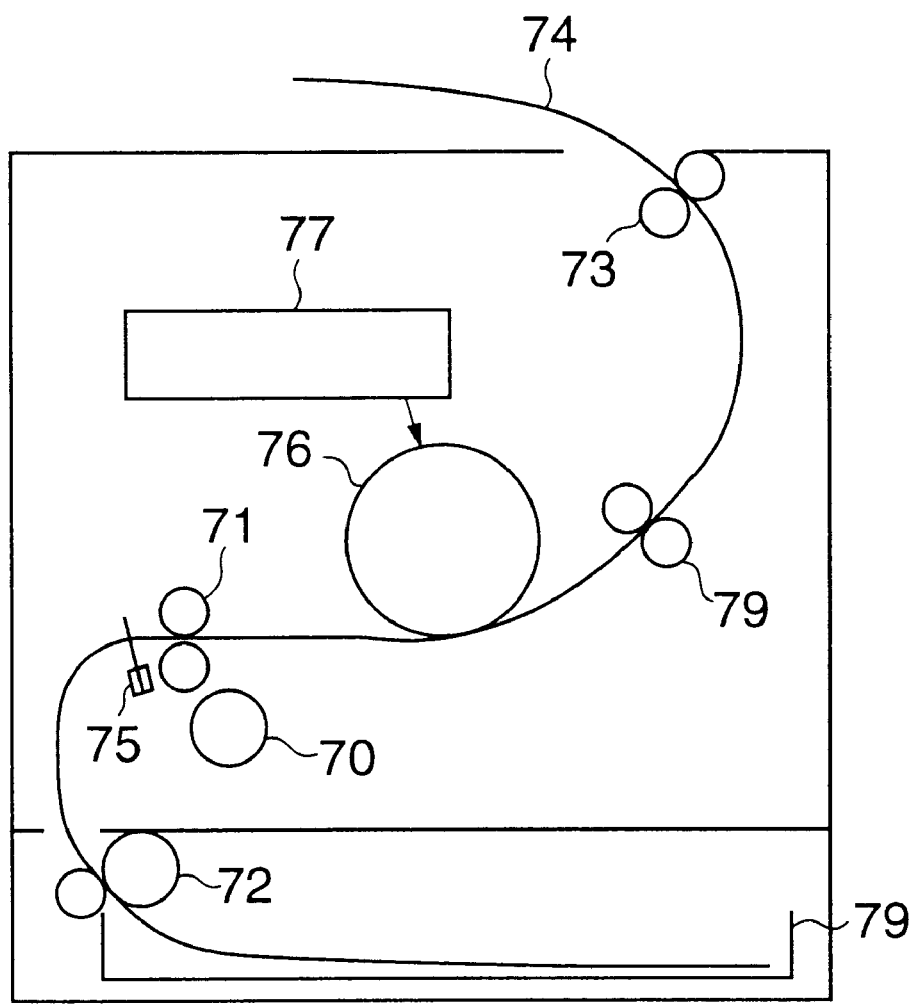
FIG. 2 is a diagram generally showing an example of a printer.
Figures 3, 4:
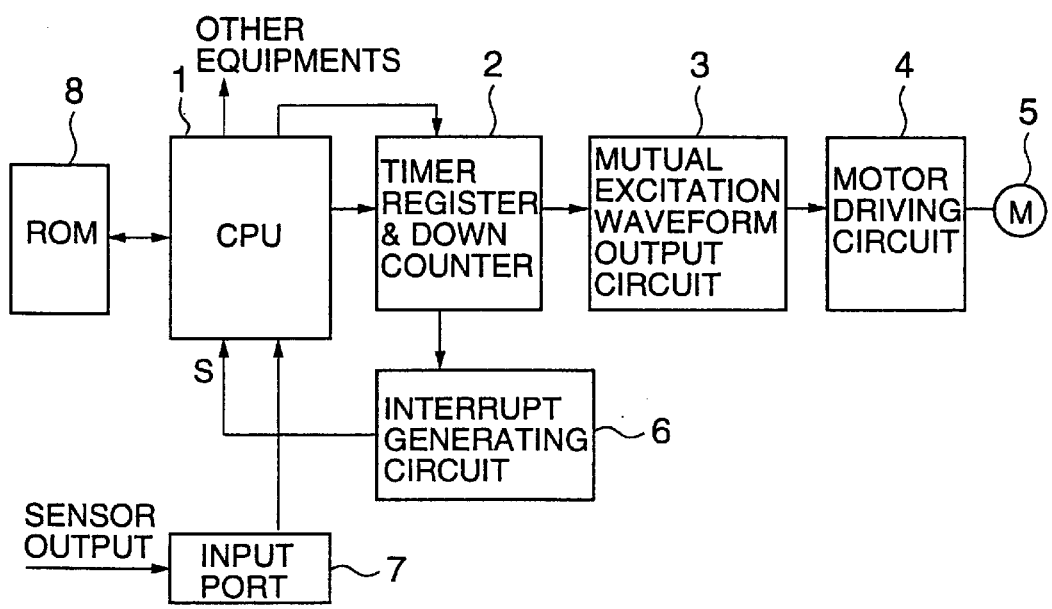
FIG. 3 is a system block diagram showing a conventional stepping motor control unit of the printer.
FIG. 4 is a diagram showing an acceleration table and a deceleration table stored in a ROM.
Figure 5:
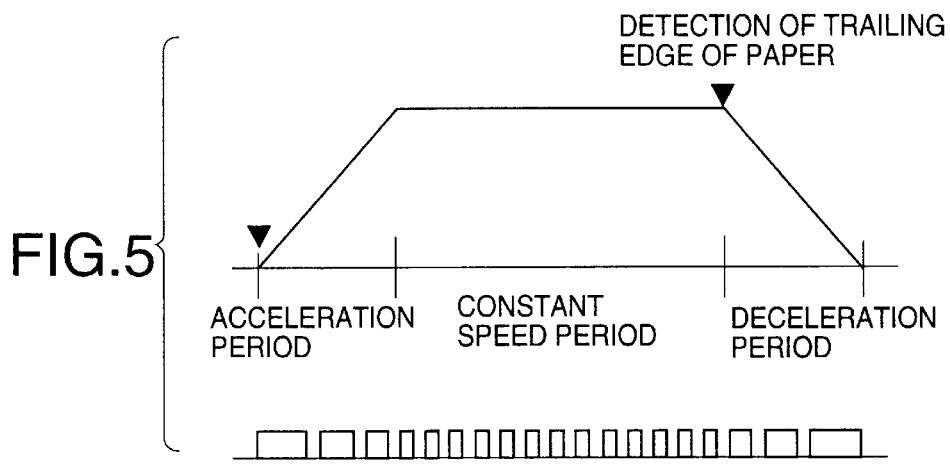
FIG. 5 is a diagram showing excitation pulses during each period.

The sensor output supplied to the noise elimination circuit 30 corresponds to the output signal of the sensor 75 shown in FIG. 2, for example. The leading edge detection circuit 31 detects a leading edge of the sensor output signal, and the trailing edge detection circuit 32 detects a trailing edge of the sensor output signal.

The selection circuit 34 receives an output of the leading edge detection circuit 31, an output of the trailing edge detection circuit 32, and an output of the OR circuit 33 which receives the outputs of the leading edge detection circuit 31 and the trailing edge detection circuit 32. The selection circuit 34 selectively outputs one of the outputs of the leading edge detection circuit 31, the trailing edge detection circuit 32, the OR circuit 33 and no signal, based on a signal selection instruction from the processor 1A. This selection made by the selection circuit 34 sets the conditions for starting the deceleration control, and the conditions are determined by the processor 1A. For example, in a case where the resist motor 70 and the resist roller 71 are to be decelerated when the sensor 75 detects the trailing edge of the paper, the output of the trailing edge detection circuit 32 is selected. In a case where a large number of paper is to be supplied or ejected continuously, the processor 1A instructs the selection of no signal, because there is no need for an interrupt during the deceleration and stopping control, that is, since it is unnecessary to detect the leading and trailing edges of the paper.

Figure 14:
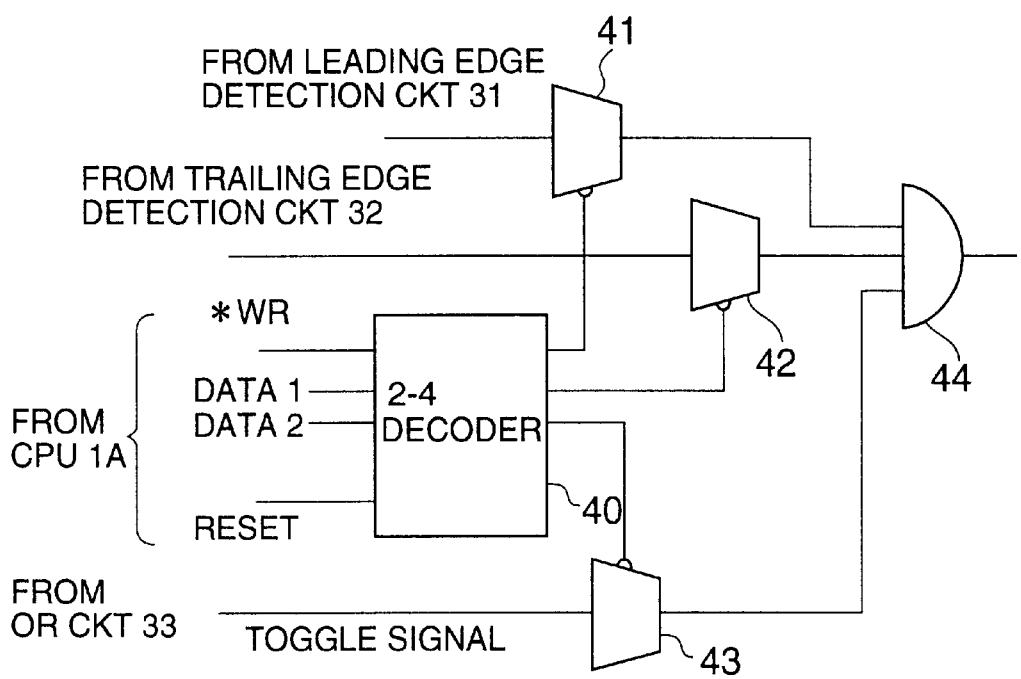
FIG. 14 is a circuit diagram showing an embodiment of a selection circuit.

FIG. 14 is a circuit diagram showing an embodiment of the selection circuit 34. The selection circuit 34 shown in FIG. 14 includes a 2–4 decoder 40, selectors 41 through 43, and an AND circuit 44.

When an enable signal *WR from the processor 1A has a low level, data Data1 and Data2 are set in the 2–4 decoder 40. The selector 41 outputs the output of the leading edge detection circuit 31 when a control signal from the 2–4 decoder 40 has a low level, and outputs a high-level signal when the control signal has a high level. Similarly, the selector 42 outputs the output of the trailing edge detection circuit 32 when a control signal from the 2–4 decoder 40 has a low level, and outputs a high-level signal when the control signal has a high level. The selector 43 outputs a toggle signal from the OR circuit 33 when a control signal from the 2–4 decoder 40 has a low level, and outputs a high-level signal when the control signal has a high level.

When the data Data1 and Data2 are (0, 0), the control signals supplied to the selectors 41 through 43 all have a high level. Only the control signal supplied to the selector 41 has a low level when the data Data1 and Data2 are (0, 1). Only the control signal supplied to the selector 42 has a low level when the data Data1 and Data2 are (1, 0). Only the control signal supplied to the selector 43 has a low level when the data Data1 and Data2 are (1, 1). Outputs of the selectors 41 through 43 are supplied to the AND circuit 64.

An output of the AND circuit 64 is input to a preset terminal of the interrupt prohibit register 35 shown in FIG. 13.

The interrupt prohibit register 35 shown in FIG. 13 corresponds to the interrupt prohibit circuit 10 shown in FIG. 9. In the constant speed control state, the processor 1A supplies to the interrupt prohibit register 35 a low-level enable signal *WR and an interrupt prohibit data DATA which is "0". As a result, an output of the interrupt prohibit register 35 is turned OFF, indicating the interrupt prohibit state. When a negative direction pulse from the selection circuit 34 is applied to the preset terminal of the interrupt prohibit register 35, the output of the interrupt prohibit register 35 is turned ON, indicating the interrupt enable state. In order to turn ON the output of the interrupt prohibit register 35 regardless of the position of the paper, the processor 1A sets in the interrupt prohibit register 35 the interrupt enable data DATA which is "1".

The AND circuit 36 and the JK flip-flop circuit 37 shown in FIG. 13 correspond to the interrupt generating circuit 6 shown in FIG. 9. The AND circuit 36 receives a mutual excitation count-up signal (time completion pulse) from the time measuring means 2A, and an output of the interrupt prohibit register 35. The JK flip-flop circuit 37 receives an output of the AND circuit 36 and an interrupt cancel signal from the processor 1A.

When the mutual excitation count-up signal (time completion pulse) output from the time measuring means 2A is turned ON, the JK flip-flop circuit 37 is set and the interrupt signal SS output from the flip-flop circuit 37 is turned ON, thereby generating an interrupt with respect to the processor 1A. When the processor 1A enters the interrupt control, the processor 1A turns ON the interrupt cancel signal. As a result, the JK flip-flop circuit 37 is reset, and the interrupt signal SS is turned OFF.

Figure 6:
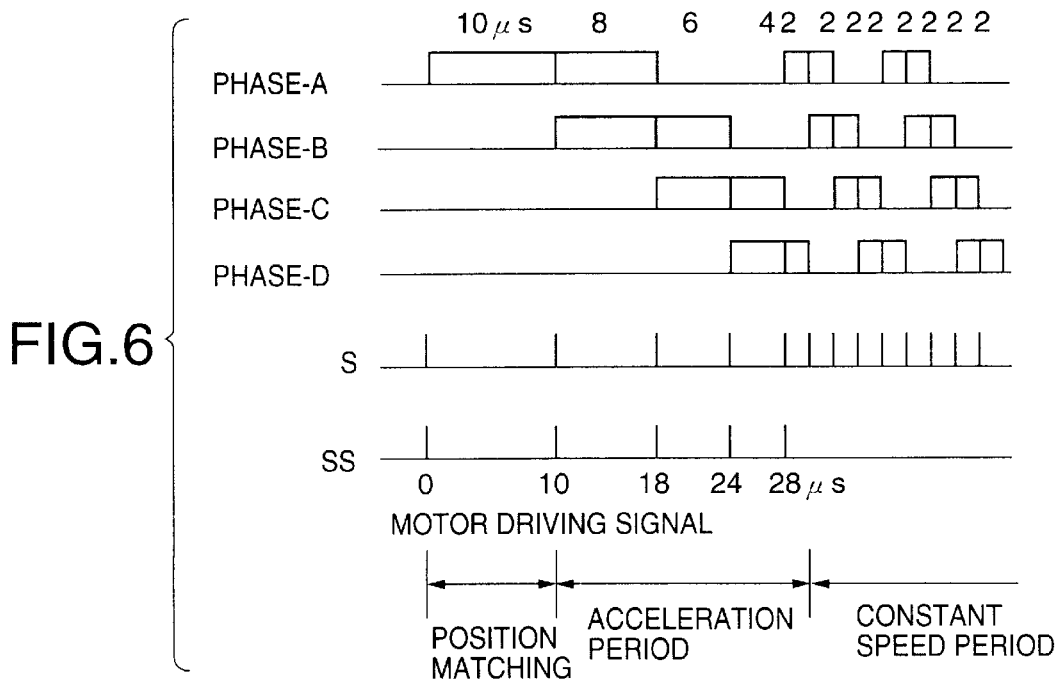
FIG. 6 is a diagram showing a mutual excitation waveform for each phase during a start control and a constant speed control of a 2-phase excitation type stepping motor.
Figure 7:
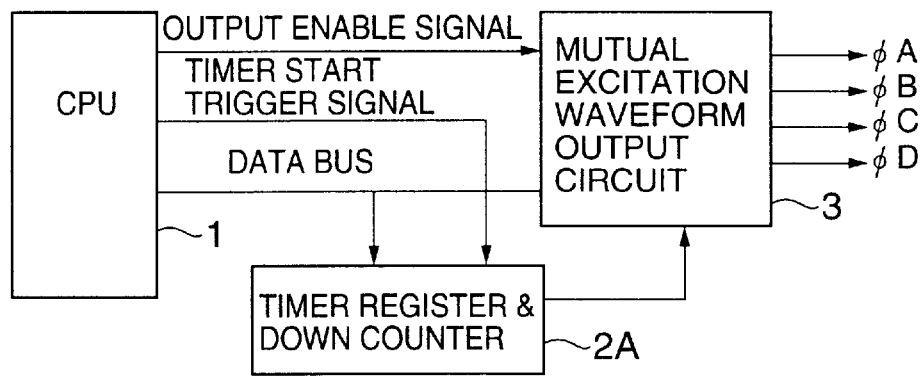
FIG. 7 is a diagram for explaining signal exchanges between the timer register down counter and a mutual excitation waveform output circuit.
Figure 8:
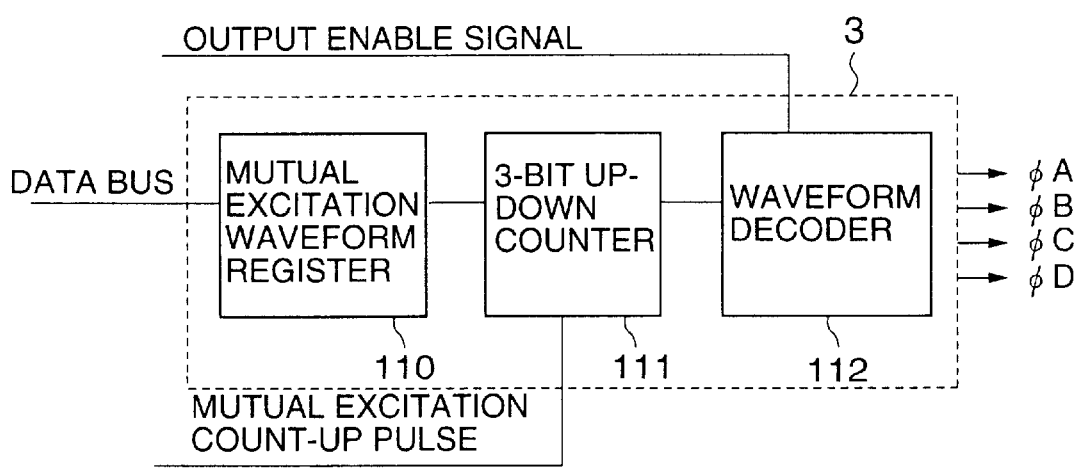
FIG. 8 is a diagram showing the construction of the mutual excitation waveform output circuit shown in FIG. 3.

The interrupt signal SS is shown at the bottom part of FIG. 6 described above. As may be seen from FIG. 6, the interrupt signal SS is not generated during the constant speed period.

Figure 15:
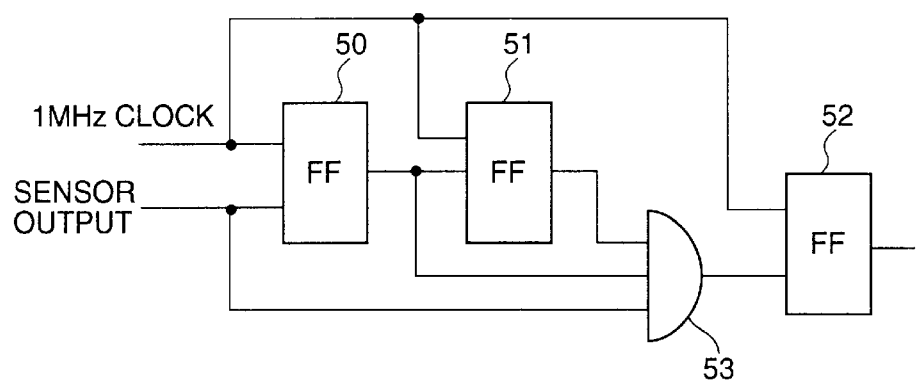
FIG. 15 is a circuit diagram showing an embodiment of a noise elimination circuit.

FIG. 15 is a circuit diagram showing an embodiment of the noise elimination circuit 30 shown in FIG. 13. The sensor output includes a noise at a signal part corresponding to the edge of the paper, and the noise elimination circuit 30 is provided to eliminate this noise in the sensor output.

The noise elimination circuit 30 includes flip-flop circuits 50 through 52, and an AND circuit 53. A 1MHz clock is input to clock terminals of the flip-flop circuits 50 through 52. The sensor output is input to a data input terminal of the flip-flop circuit 50, and an output of the flip-flop circuit 50 is input to a data input terminal of the flip-flop circuit 51. The sensor output, the output of the flip-flop circuit 50 and an output of the flip-flop circuit 51 are input to the AND circuit 53. An output of the AND circuit 53 is input to a data input terminal of the flip-flop circuit 52. By the noise elimination circuit 30 having the construction shown in FIG. 15, it becomes possible to eliminate the noise existing in the vicinities of the rising and falling edges of the sensor output.

Figure 16:
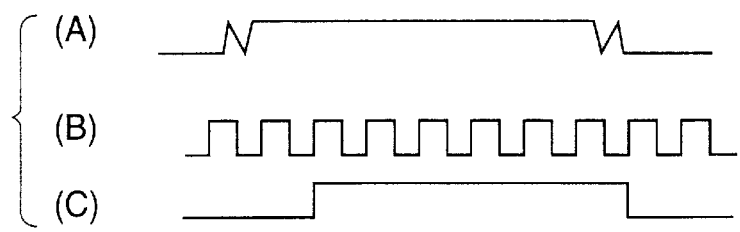
FIGS. 16(A) through 16(C) are time charts for explaining the operation of the noise elimination circuit.

FIGS. 16(A) through 16(C) are time charts for explaining the operation of the noise elimination circuit 30 shown in FIG. 15. FIG. 16(A) shows the sensor output input to the noise elimination circuit 30. FIG. 16(B) shows the 1 MHz clock input to the flip-flop circuits 50 through 52. In addition, FIG. 16(C) shows the sensor output after the noise elimination, that is, an output of the noise elimination circuit 30 obtained from the flip-flop circuit 52.

Therefore, according to the present invention, the interrupt is prohibited when the interrupt control is unnecessary, such as when the constant speed control is being carried out.

On the other hand, the interrupt prohibit is cancelled in response to the sensor output or the like when the interrupt control is necessary. As a result, it is possible to reduce the load on the stepping motor control of the processor, and the processor can control other equipments due to the reduced load. For example, a temperature control of a fixing roller unit is carried out at predetermined time intervals, but the temperature control cannot be carried out accurately if the time intervals of the temperature control are long. But according to the present invention, it is possible to shorten the time which is required for the processor to carry out the stepping motor control, and the time intervals of the temperature control can be shorted by an amount corresponding to the shortened time required for the stepping motor control, thereby enabling an ideal uniform fixing. In addition, the reduced load on the processor allows the processor to meet other user demands, such as control of additional units which are additionally provided on the printer. For example, it is possible to additionally provide on the printer a unit such as a multi-stacker unit which requires sensor detection and motor control. Furthermore, because the interrupt generating circuit used in the present invention is constructed to cope with all forms of stepping motor control, the interrupt generating circuit can be produced at a low cost by integrally forming the interrupt generating circuit on a single printed circuit together with a stepping motor control circuit which includes the time measuring means, the mutual excitation waveform output circuit and the motor driving circuit.

Of course, the application of the present invention is not limited to the control of the stepping motor of an image forming apparatus, and the present invention is applicable to the control of any stepping motor.

Further, the present invention is not limited to these embodiments, but various variations and modifications may be made without departing from the scope of the present invention.

What is claimed is:

1. A stepping motor control unit for controlling a stepping motor, comprising:

time measuring means for measuring time outputting a time completion pulse when a predetermined time elapses;

a mutual excitation waveform output circuit switching a mutual excitation waveform to be applied to the stepping motor in response to the time completion pulse;

an interrupt prohibit circuit outputting an interrupt enable signal which indicates an interrupt enable state or an interrupt prohibit state;

an interrupt generating circuit generating an interrupt signal in response to the time completion pulse only when the interrupt enable signal indicates the interrupt enable state; and a processor controlling the stepping motor every time the interrupt signal is received.

2. The stepping motor control unit as claimed in claim 1, wherein said time measuring means includes a timer register which stores a value based on which the time is measured, and said processor includes means for changing the value in the timer register.

3. The stepping motor control unit as claimed in claim 1, wherein said processor includes means for controlling said interrupt prohibit circuit to output an interrupt enable signal which indicates the interrupt prohibit state when the stepping motor reaches a predetermined speed.

4. An image forming apparatus comprising:

image forming means for forming an image on a medium;

transport means for transporting the medium;

a stepping motor driving said transport means;

time measuring means for measuring time outputting a time completion pulse when a predetermined time elapses;

a mutual excitation waveform output circuit switching a mutual excitation waveform to be applied to the stepping motor in response to the time completion pulse;

an interrupt prohibit circuit outputting an interrupt enable signal which indicates an interrupt enable state or an interrupt prohibit state;

an interrupt generating circuit generating an interrupt signal in response to the time completion pulse only when the interrupt enable signal indicates the interrupt enable state; and a processor controlling the stepping motor every time the interrupt signal is received.

5. The image forming apparatus as claimed in claim 4, which further comprises:

a sensor detecting a position of the medium, said interrupt prohibit circuit outputting the interrupt enable signal based on an output of said sensor and an output of said processor.

6. The image forming apparatus as claimed in claim 4, wherein said time measuring means includes a timer register which stores a value based on which the time is measured, and said processor includes means for changing the value in the timer register.

7. The image forming apparatus as claimed in claim 4, wherein said processor includes means for controlling said interrupt prohibit circuit to output an interrupt enable signal which indicates the interrupt prohibit state when the stepping motor reaches a predetermined speed.

* * * * *